United States Patent [19]

Dugan

[11] E Patent Number: Re. 33,003

[45] Reissued Date of Patent: Aug. 1, 1989

[54] JOINT SYSTEM

[75] Inventor: Larry M. Dugan, Boulder, Colo.

[73] Assignee: Adolph Coors Company, Golden, Colo.

[21] Appl. No.: 197,761

[22] Filed: May 23, 1988

Related U.S. Patent Documents

Reissue of:

[64] Patent No.: 4,719,845
Issued: Jan. 19, 1988
Appl. No.: 804,628
Filed: Dec. 5, 1985

[51] Int. Cl.[4] ..... F16J 1/10; F01B 11/02; F16B 7/10

[52] U.S. Cl. ..... 92/84; 92/170.1; 403/335; 403/291; 403/377; 403/360; 277/188 A; 464/106

[58] Field of Search ..... 92/84, 129, 170, 171, 92/249; 277/188 A; 74/110; 464/87, 92, 106, 147, 158; 403/2, 132, 133, 225, 276, 291, 335, 345, 360, 361, 376, 377

[56] References Cited

U.S. PATENT DOCUMENTS

| | | | |
|---|---|---|---|
| 191,159 | 5/1877 | Krum | 403/52 |
| 891,993 | 6/1908 | Hess | 403/220 |
| 1,134,973 | 4/1915 | Stanley | 74/581 |
| 1,522,417 | 6/1925 | Cock | 74/582 |
| 1,734,816 | 11/1929 | Ludwig | 92/129 X |
| 1,796,687 | 3/1931 | Esnault-Pelterie | 74/581 |
| 1,797,061 | 3/1931 | Gunn | 74/581 |
| 1,855,627 | 4/1932 | Enright | 74/581 |
| 1,902,038 | 3/1933 | McAllister | 403/144 |
| 2,488,730 | 11/1949 | Lake et al. | 74/47 |
| 2,496,702 | 2/1950 | Dykman et al. | 464/158 X |
| 2,509,081 | 5/1950 | Bluth et al. | 403/376 X |
| 2,510,414 | 6/1950 | Philbrick | 403/362 X |
| 2,514,051 | 7/1950 | Gredell | 464/92 X |
| 2,639,172 | 3/1952 | Leonard, Jr. | 403/51 |
| 2,862,736 | 12/1958 | Russell | 277/188 A X |
| 2,868,570 | 1/1959 | Hines et al. | 403/226 |
| 3,096,689 | 7/1963 | Kytta | 92/84 X |
| 3,155,015 | 11/1964 | Genz | 92/249 |
| 3,636,824 | 1/1972 | Clark | 92/249 |
| 3,670,630 | 6/1972 | Tyson et al. | 92/129 |
| 3,857,642 | 12/1974 | Miller | 92/129 X |
| 3,920,340 | 11/1975 | Jones et al. | 403/362 X |
| 4,160,626 | 7/1979 | Bell | 417/403 |
| 4,252,458 | 2/1981 | Keen | 403/362 X |
| 4,354,353 | 10/1982 | Laue | 60/554 |
| 4,366,891 | 1/1983 | Maruyama | 192/99.5 |
| 4,516,479 | 5/1985 | Vadasz | 92/170 |
| 4,565,541 | 1/1986 | Obrecht | 464/106 X |

FOREIGN PATENT DOCUMENTS

| | | | |
|---|---|---|---|
| 654934 | 7/1951 | United Kingdom | 92/84 |

*Primary Examiner*—Robert E. Garrett
*Assistant Examiner*—George Kapsalas
*Attorney, Agent, or Firm*—Klaas & Law

[57] ABSTRACT

A joint for connecting a driving means to a driven means for reciprocating movement wherein a confined deformable, non-compressible material is in contact with a surface area of the driving means and with a surface area of the driven means and when a force is applied to the driving means to move the driving means toward the driven means, the deformable, non-compressible material deforms to compensate for any misalignment between the driving means and the driven means until is reaches it non-compressible state so that a uniform force is then transmitted across the surface area of the driven means in one direction to move the driven means.

14 Claims, 2 Drawing Sheets

JOINT SYSTEM

Matter enclosed in heavy brackets [ ] appears in the original patent but forms no part of this reissue specification; matter printed in italics indicates the additions made by reissue.

FIELD OF THE INVENTION

This invention relates generally to a joint for connecting two rods together for reciprocation along aligned longitudinal axes and more particularly to a joint for connecting two rods together for reciprocation along aligned longitudinal axes and designed to compensate for any misalignment while transmitting the reciprocating forces particularly where large forces are involved.

BACKGROUND OF THE INVENTION

In many types of equipment, such as in pumps, it is desirable to reciprocate a piston through a cylinder to perform work. The piston is connected to a piston rod which in turn is connected to a cross-head rod by a suitable joint. The cross-rod is driven by a motor driven crank and is mounted in guides so that it reciprocates along a longitudinal axis. In such type of equipment, it is essential that the piston runs true so as to avoid excessive wear. This is particularly so where the cylinder of the equipment has a ceramic liner. Pumps having ceramic cylinder liners have superior abrasion and corrosion resistance compared to conventional metal cylinder liners. However, even minor misalignment problems between the ceramic cylinder liner and the pump's metal piston can cause excessive abrasion of the ceramic cylinder liner and result in a substantial reduction in the life of the ceramic cylinder liner. The misalignment can result from angular offset between the reciprocal axis of the piston rod relative to the cross-head rod or lateral offset in that the reciprocal axis of the piston rod is parallel to but laterally offset from the reciprocal axis of the cross-head rod. One solution to this problem is set forth in U.S. Pat. No. 2,639,172 to Leonard, Jr., wherein a cavity is formed between one end of a piston rod and the associated end of a cross-head rod. The cavity is filled with a fluid and is sealed by a bellows. One of the problems associated with equipment disclosed in Leonard, Jr., as set forth in column 4, lines 21–39, is that it is not suitable for use in transmitting large forces. Also, the structure in Leonard, Jr., is designed so that any misalignment results in movement of the plunger.

BRIEF DESCRIPTION OF THE INVENTION

This invention provides a joint for connecting a driving means to a driven means for reciprocating movement wherein a confined deformable, non-compressible material is in contact with a surface area of the driving means and with a surface area of the driven means and when a force is applied to the driving means to move the driving means toward the deformable, non-compressible material, it deforms to compensate for any misalignment between the driving means and the driven means until it reaches its non-compressible state so that a uniform force in one direction is then transmitted across the surface area of the driven means.

In a preferred embodiment of the invention, the driving means comprises a cross-head rod connected to a suitable means so that the cross-head rod is reciprocated along a longitudinal axis. The driven means comprises a piston rod having a piston connected thereto which piston is mounted for reciprocating movement in a cylinder having a ceramic liner. The longitudinal axis of the piston rod is in alignment with the longitudinal axis of the cylinder. The piston rod is connected to the cross-head rod so that movement of the cross-head rod moves the piston rod and therefore the piston in the cylinder. The joint for connecting the cross-head rod to the piston rod comprises a cylindrical cavity formed in one end of the piston rod and a cylindrical plug formed on the associated end of the cross-head rod. The plug has a diameter slightly smaller than the diameter of the cavity so that the plug may be inserted into the cavity and allow for slight axial and/or lateral misalignment. A solid, deformable, non-compressible material is located in the cavity and is in contact with a surface area of the plug and with a surface area of the cavity. Means are provided for preventing movement of the solid, deformable, non-compressible material out of the cavity. When a force is applied to the cross-head rod to move it toward the piston rod and there is some degree of misalignment between the cross-head rod and the piston rod, the cross-head rod will deform the solid, deformable, non-compressible material until it reaches its non-compressible state so that a uniform force in one direction will be transmitted across the surface area of the cavity of the piston rod. Thus, there will be no force tending to change the alignment of the longitudinal axis of the piston rod with the longitudinal axis of the cylinder.

In another embodiment of the invention, the piston is provided with means to extend to life of the ceramic cylinder liner. In this embodiment, the piston comprises a generally cylindrical metallic base having a sealing means secured thereto. An annular recess is formed in the metallic base adjacent to the sealing means. A ring, formed from PEEK, is seated in the recess so as to provide a more compatible material from the ceramic liner in the event of excessive wear of the sealing means.

It is an object of this invention to provide a joint for connecting a driving means to a driven means which joint compensates for any misalignment between the driving means and the driven means so that a uniform force in one direction will be applied across a surface area of the driven means.

It is another object of this invention to provide means for providing protection for a ceramic cylinder liner against excessive abrasive forces.

Additional objects, advantages and novel features of the invention are set forth in part in the description which follows which will be understood by those skilled in the art upon examination of the following or may be learned by practice of the invention. The objects and advantages of the invention may be realized and obtained by means of the instrumentalities and combinations particularly pointed out in the appended claims.

DETAILED DESCRIPTION OF THE INVENTION

Figure 1:
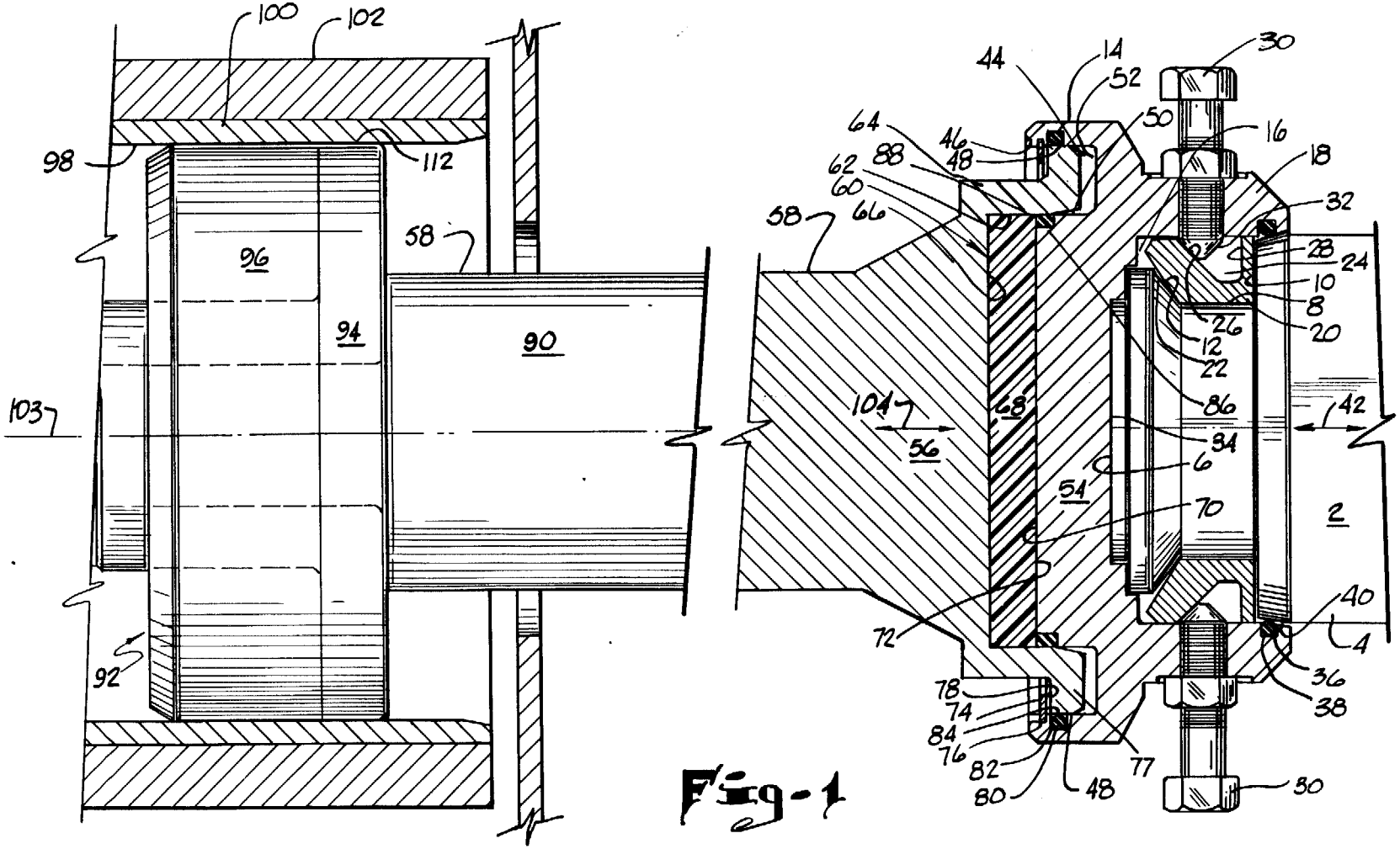
FIG. 1 is a view with parts in section of one embodiment of this invention.

In FIG. 1, there is illustrated the principal portions of one embodiment of the invention described in this application. An end portion 2 of a cross-head rod 4 has an end surface 6 and an annular groove 8 spaced a short distance from the end surface 6. The annular groove 8 has a perpendicular side wall 10 and a sloping side wall 12. A member 14 has an opening 16 defined by a projecting annular side wall 18. Means are provided for securing the member 14 to the end 2 of the cross-head rod 4. A split ring clamp 20 is positioned in the annular groove 8 and has a sloping surface 22 in contact with the sloping surface 12. The split ring clamp 20 has an annular recess 24 having a sloping wall 26 and a perpendicular wall 28. A plurality of bolts 30 are threadedly mounted in the annular side wall 18 and are provided with heads 32 having sloping surfaces. As the bolts 30 are tightened, the sloping heads 32 will act against the sloping surface 26 which will cause the sloping surface 22 to act against the sloping surface 12 so as to pull the surface 34 of the member 14 into contact with the end surface 6 of the end portion 2 so as to secure the member 14 onto the end portion 2 of the cross-head rod 4. An O-ring 36 seated in a recess 38 in the annular side wall 18 contacts a sloping surface 40 on the end portion 2 to seal against contaminating materials. The cross-head rod 4 is connected to suitable means (not shown) which reciprocate the cross-head rod along the longitudinal axis 42.

An annular recess 44 is provided in the end surface 46 of the member 14 and is defined by two spaced apart walls 48 and 50 extending generally in an axial direction and a wall 52 extending generally in a radial direction. The portion of the member 14 inside of the wall 50 comprises a plug 54 for a purpose described below.

An end portion 56 of a piston rod 58 has a cavity 60 defined by an inner side wall 62 of a hollow annular projection 64. The cavity 60 has a bottom surface 66. A solid, deformable, non-compressible material 68 is positioned in the cavity 60. In assembling the joint, the annular projection 64 is inserted into the recess 44 until the surface 70 of the plug 54 is almost in contact with the surface 72 of the solid, deformable, non-compressible material 68. The annular projection 64 is retained in the recess 44 by a retaining ring 74 seated in a groove 76 in the wall 48 and bearing against a lip 78 on the annular projection 64. As illustrated in FIG. 1, the distance between the retaining means 74 and the bottom wall 52 of the recess [4] *44* is greater than the thickness of the flange 77 having a lip 78 to allow limited movement between the plug 54 and the solid, deformable, non-compressible material 68. An O-ring 80 seated in a groove 82 in the wall 48 is in sealing engagement with a wall 84 of the annular projection 64 to seal against entry of contaminants. The plug 54 is provided with an annular recess 86 in which is seated an O-ring 88 in sealing engagement with the walls of the recess 86 and the wall 62 of the cavity 60 to prevent movement of the solid, deformable, non-compressible material 68 out of the cavity 60.

The other end 90 of the piston rod 58 terminates in a piston 92 having a generally cylindrical metallic base 94 and a sealing means 96 secured thereto. The sealing means 96 is in contact with the inner wall 98 of a ceramic cylinder liner 100 which is mounted in the cylinder 102 having a longitudinal axis 103. In the preferred embodiment, the cylinder 102 is part of a pump. The piston rod 58 and the piston 92 reciprocate along the longitudinal axis 104. The longitudinal axis 103 of the cylinder 102 and the ceramic cylinder liner 100 is in alignment with the longitudinal axis 104 of the piston rod 58 and piston 92.

In operation, a driving force is applied to the cross-head rod 4 by suitable means, such as a motor (not shown), to move the cross-head rod 4 toward the piston rod 56. The movement of the cross-head rod 4 moves the plug 54 into contact with the solid, deformable non-compressible material 68. If there is any misalignment of the longitudinal axis 42 of the cross-head rod 4 relative to the longitudinal axis 104 of the piston rod 58, the surface 70 of the plug 54 will be canted relative to the surface 66 of the piston rod 58. As the plug 54 moves into contact with the solid, deformable non-compressible material 68, it will deform the solid, deformable, non-compressible material 68 to fill whatever shape of space exists between the surface 70 and the surface 66 until the solid, deformable, non-compressible material 68 reaches its non-compressible state. When the non-compressible state has been reached, the driving force applied to the cross-head rod 4 will be transmitted to the piston rod 58 uniformly and in one direction across the surface area 66. The one direction will be parallel to the longitudinal axis [58] *104* of the piston rod [104] *58*. Because of this operation, there will be substantially no force tending to change the alignment of the longitudinal axis of the piston rod with the longitudinal axis of the cylinder.

Figure 2:
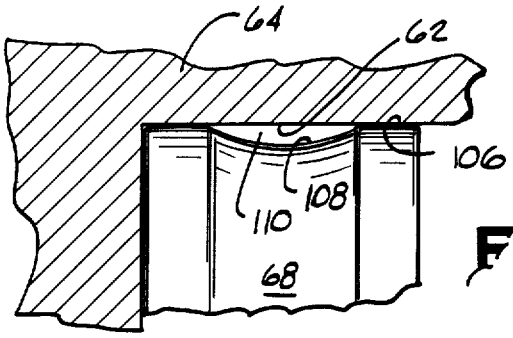
FIG. 2 is an enlarged view of a portion of another embodiment of this invention.

In the embodiment of the invention illustrated in FIG. 2, the annular surface 106 of the solid, deformable, non-compressible material 68 is provided with a recess 108 so as to form a cavity 110 between the annular surface 106 and the side wall 62 of the projection 64. With this cavity less force is required to deform the solid, deformable, non-compressible material until it reaches its non-compressible state so that the uniform force in one direction will be applied to the surface area.

Figure 3:
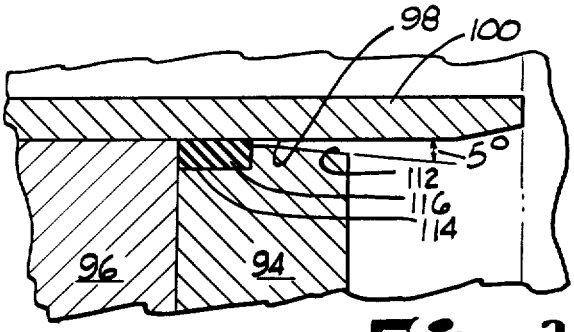
FIG. 3 is an enlarged view of a portion of another embodiment of the invention.

In FIG. 3, there is illustrated an embodiment of the invention which provides for wear of the sealing material in the piston. In the embodiment of the invention illustrated in FIG. 1, the metallic base 94 is machined so that the outer side wall 112 is spaced an absolute minimum distance from the inner wall 98 of the ceramic liner 100. This construction is necessary so that the material in the sealing means will not be able to extrude into any space between the inner wall 98 and the outer side wall 112. When the material in the sealing means wears, there is a tendency for a portion of the metallic base 94 to come into contact with the inner surface 98. This creates an abrasive force acting on the ceramic liner 100 to substantially reduce the life of the ceramic liner 100. In the embodiment illustrated in FIG. 3, a recess 114 is machined into the outer side wall 112 of the metallic base 94. An annular ring 116 is seated in the recess 114 and is dimensioned so that the outer surface 118 thereof is spaced an absolute minimum distance from the inner surface 98 for the same purpose as described above. The annular ring 116 is formed from PEEK which is a polyester ether ketone. The PEEK material is substantially more compatible with the ceramic liner than the metallic base material. Therefore, when the material in the sealing means 96 wears, the ceramic liner 100 will not deteriorate as rapidly so that the pump may continue to operator for a substantial period of time.

In one embodiment of the invention, the joint is used in association with an oil well mud pump having a ceramic cylinder liner. The cross-head rod 4 is driven by a motor driven crank so that the cross-head rod reciprocates along a longitudinal axis. A member 14 is connected to the cross-head rod 4 and has a plug 54 having an effective diameter of about 4.5 inches. A piston rod 58 is connected to the member 14 through a flange 48 and has a cavity 66 having an effective diameter of about 4.5 inches. A generally cylindrical urethane pad 68 is located in the cavity 66 and has an effective diameter of about 4.5 inches and a thickness of about 0.44 inches. The piston rod 58 is connected to a piston 92 having a metallic base 94 having an effective diameter of in the range from about 4 to 7 inches. The sealing means 96 comprises rubber or similar materials having an effective diameter of about 4 to 7 inches and a length of about 1.7 inches. A recess 114 is provided in the metallic base 94 and has a length of about 0.5 inches and a depth of about 0.12 inches. An annular ring 116, formed from PEEK, is seated in the recess 114 and has an outer diameter of about 4 to 7 inches, a length of about 0.5 inches and a thickness of about 0.12 inches. A ceramic cylinder liner 100 having an inner cylindrical surface having an effective diameter of about 4 to 7 inches is secured to the cylinder 102. The cross-head rod 4, piston rod 58 and piston 92 are reciprocated at a rate of about 120 strokes per minute so as to have a stroke of about 10 to 12 inches and a max cycle loading of about 112,000 pounds. The max force applied to the surface 66 of the cavity 62 is about 7,000 psi. The urethane pad 68 is capable of deforming to correct misalignment problems wherein the angular misalignment of the longitudinal axes of the cross-head rod to the piston rod is up to about 0.15 degrees and the lateral misalignment is about 0.042 inches. It is understood that the foregoing description of one embodiment of the invention is for illustrative purposes only and that the invention may be used in other environments and be constructed of different operating parameters.

It is contemplated that the inventive concepts herein described may be variously otherwise embodied and it is intended that the appended claims be construed to include alternative embodiments of the invention except insofar as limited by the prior art.

What is claimed is:

1. Apparatus for increasing the working life of an oil well mud pump having a ceramic cylinder liner wherein the force applied to drive the piston operating in the ceramic cylinder lining is relatively high and which piston is reciprocated at relatively high rates with each stroke moving through a substantial distance comprising:

a pump means for use as an oil well mud pump;

said pump means having a cylinder;

a ceramic cylinder liner secured to said cylinder;

a piston mounted for reciprocation in said ceramic cylinder liner at relatively high rates with each stroke moving through a substantial distance;

a piston rod having one end thereof fixedly connected to said piston;

said piston rod having a longitudinal axis and an other end;

a cavity having a generally cylindrical inner surface and a generally planar bottom surface formed in the other end of said piston rod;

a solid, deformable, non-compressible material having a generally cylindrical outer surface and generally planar end surfaces, which are continuous in all directions, located in said cavity;

said solid, deformable, non-compressible material having a diameter slightly less than but substantially equal to the diameter of said inner surface of said cavity;

reciprocating driving means for applying forces to said piston rod so as to reciprocate said piston rod and therefore said piston in said ceramic cylinder liner;

said driving means having a longitudinal axis;

coupling means for connecting said driving means to said other end of said piston rod so that reciprocal movement of said driving means causes reciprocal movement of said piston rod;

said coupling means having a plug having a generally cylindrical outer surface having a diameter slightly less than but substantially equal to said diameter of said inner surface of said cavity and having a generally planar end surface located in said cavity and adapted to contact one of said generally planar end surfaces of said solid, deformable, non-compressible material to deform said solid, deformable, non-compressible material until it reaches its non-compressible state so that said driving force from said driving means is distributed evenly across said generally planar bottom surface of said cavity of said piston rod, including those instances wherein said longitudinal axes of said piston rod and said driving means are not in alignment so as to move said piston rod in one direction;

an annular recess formed in said outer surface of said plug and said end surface of said plug;

retaining means in said annular recess for preventing extrusion of said solid, deformable, non-compressible material out of said cavity when a relatively high force is applied thereto by said driving means; and movement permitting means for permitting limited relative movement between said plug and said solid, deformable, non-compressible material so as to allow for the formation of a separation therebetween.

2. Apparatus for increasing the working life of an oil well mud pump having a ceramic cylinder liner wherein the force applied to drive the piston operating in the ceramic cylinder lining is relatively high and which piston is reciprocated at relatively high rates with each stroke moving through a substantial distance comprising:

a pump means for use as an oil well mud pump;

said pump means having a cylinder;

a ceramic cylinder liner secured to said cylinder;

a piston mounted for reciprocation in said ceramic cylinder liner at relatively high rates with each stroke moving through a substantial distance;

a piston rod having one end thereof fixedly connected to said piston;

said piston rod having a longitudinal axis and an other end;

a cavity having a generally cylindrical inner surface and a generally planar bottom surface formed in the other end of said piston rod;

a solid, deformable, non-compressible material having a generally cylindrical outer surface and generally planar end surfaces located in said cavity;

said solid, deformable, non-compressible material having a diameter slightly less than but substantially equal to the diameter of said inner surface of said cavity;

reciprocating driving means for applying forces to said piston rod so as to reciprocate said piston rod and therefore said piston in said ceramic cylinder liner;

said driving means having a longitudinal axis;

coupling means for connecting said driving means to said other end of said piston rod so that reciprocal movement of said driving means causes reciprocal movement of said piston rod;

said coupling means having a plug having a generally cylindrical outer surface having a diameter slightly less than but substantially equal to said diameter of said inner surface of said cavity and having a generally planar end surface located in said cavity and adapted to contact one of said generally planar end surfaces of said solid, deformable, non-compressible material to deform said solid, deformable, non-compressible material until it reaches its non-compressible state so that said driving force from said driving means is distributed evenly across said generally planar bottom surface of said cavity of said piston rod, including those instances wherein said longitudinal axes of said piston rod and said driving means are not in alignment so as to move said piston rod in one direction;

an annular recess formed in said outer surface of said plug and said end surface of said plug;

retaining means in said annular recess for preventing extrusion of said solid, deformable, non-compressible material out of said cavity when a relatively high force is applied thereto by said driving means;

movement permitting means for permitting limited relative movement between said plug and said solid, deformable, non-compressible material comprising:

an annular recess formed in said coupling means and surrounding said plug and having at least one cylindrical wall concentric with and facing said generally cylindrical outer surface of said plug;

said recess having a bottom wall located between said at least one cylindrical wall and said generally cylindrical outer surface;

a flange formed on said other end of said piston rod and projecting radially outwardly therefrom, said flange being located in said recess; and means for preventing removal of said flange from said recess.

3. Apparatus as in claim 2 wherein said means for preventing removal of said flange from said recess comprises:

an annular slot formed in said at least one cylindrical wall of said recess;

a retaining ring having a portion thereof seated in said annular slot and a portion thereof extending into said recess; and said portion extending into said recess having an inner diameter less than the outer diameter of said flange and being located so as to confine said flange in said recess.

4. Apparatus as in claim 3 wherein:

the distance between said retaining ring and said bottom wall of said recess is greater than the thickness of said flange so as to allow limited relative movement between said plug and said solid, deformable, non-compressible material.

5. Apparatus as in claim 4 wherein:

said force is in excess of 80,000 pounds.

6. Apparatus as in claim 5 wherein:

said driving means and said driven means are reciprocated at rates of at least 100 strokes per minute.

7. Apparatus as in claim 5 wherein:

said solid deformable, non-compressible material comprises urethane.

8. Apparatus as in claim 5 and further comprising:

an annular recess in said outer surface of said solid, deformable, non-compressible material.

*9. Apparatus for increasing the working life of a pump having a cylinder and a piston comprising:*

*a pump;*

*said pump having a cylinder;*

*a piston mounted for reciprocation in said cylinder;*

*a piston rod having one end thereof fixedly connected to said piston;*

*said piston rod having a longitudinal axis and an other end;*

*a cavity having a generally cylindrical inner surface and a generally planar bottom surface formed in said other end of said piston rod;*

*a solid, deformable, non-compressible material having a generally cylindrical outer surface and generally planar end surfaces, which are continuous in all directions, located in said cavity;*

*said solid, deformable, non-compressible material having a diameter slightly less than but substantially equal to the diameter of said inner surface of said cavity;*

*reciprocating driving means for applying forces to said piston rod so as to reciprocate said piston rod and therefore said piston in said cylinder;*

*said driving means having a longitudinal axis;*

*coupling means for connecting said driving means to said other end of said piston rod so that reciprocal movement of said driving means causes reciprocal movement of said piston rod;*

*said coupling means having a plug having a generally cylindrical outer surface having a diameter slightly less than but substantially equal to said diameter of said inner surface of said cavity and having a generally planar end surface located in said cavity and adapted to contact one of said generally planar end surfaces of said solid, deformable, non-compressible material to deform said solid, deformable, non-compressible material until it reaches its non-compressible state so that said driving force from said driving means is distributed evenly across said generally planar bottom surface of said cavity of said piston rod, including those instances wherein said longitudinal axes of said piston rod and said driving means are not in alignment so as to move said piston rod in one direction;*

*an annular recess formed in said outer surface of said plug and said end surface of said plug;*

*retaining means in said annular recess for preventing extrusion of said solid, deformable non-compressible material out of said cavity when a relatively high force is applied thereto by said driving means; and*

*movement permitting means for permitting limited relative movement between said plug and said solid, deformable, non-compressible material so as to allow for the formation of a separation therebetween.*

*10. Apparatus as in claim 9 wherein said movement permitting means comprises:*

*an annular recess formed in said coupling means and surrounding said plug and having at least one cylindrical wall concentric with and facing said generally cylindrical outer surface of said plug;*

*said recess having a bottom wall located between said at least one cylindrical wall and said generally cylindrical outer surface;*

*a flange formed on said other end of said piston rod and projecting radially outwardly therefrom;*

*said flange being located in said recess; and*

*means for preventing removal of said flange from said recess.*

*11. Apparatus as in claim 10 wherein said means for preventing removal of said flange from said recess comprises:*

*an annular slot formed in said at least one cylindrical wall of said recess;*

*a retaining ring having a portion thereof seated in said annular slot and a portion thereof extending into said recess; and*

*said portion extending into said recess having an inner diameter less than the outer diameter of said flange and being located so as to confine said flange in said recess.*

*12. Apparatus as in claim 11 wherein:*

*the distance between said retaining ring and said bottom wall of said recess is greater than the thickness of said flange so as to allow limited relative movement between said plug and said solid, deformable, non-compressible material.*

*13. Apparatus as in claim 12 wherein:*

*said solid deformable, non-compressible material comprises urethane.*

*14. Apparatus as in claim 12 and further comprising:*

*an annular recess in said outer surface of said solid, deformable, non-compressible material.*

* * * * *